United States Patent
Kim

(10) Patent No.: US 11,422,747 B2
(45) Date of Patent: Aug. 23, 2022

(54) MEMORY SYSTEM AND METHOD FOR OPERATING MEMORY CONTROLLER INCLUDED THEREIN

(71) Applicant: SK hynix Inc., Icheon-si (KR)

(72) Inventor: Jin Pyo Kim, Icheon-si (KR)

(73) Assignee: SK hynix Inc., Icheon-si (KR)

( * ) Notice: Subject to any disclaimer, the term of this patent is extended or adjusted under 35 U.S.C. 154(b) by 0 days.

(21) Appl. No.: 17/161,654

(22) Filed: Jan. 28, 2021

(65) Prior Publication Data

US 2022/0043601 A1 Feb. 10, 2022

(30) Foreign Application Priority Data

Aug. 10, 2020 (KR) .......................... 10-2020-0100162

(51) Int. Cl.
*G11C 29/00* (2006.01)
*G06F 3/06* (2006.01)
*G06F 11/10* (2006.01)

(52) U.S. Cl.
CPC .......... *G06F 3/0659* (2013.01); *G06F 3/0604* (2013.01); *G06F 3/0673* (2013.01); *G06F 11/1076* (2013.01)

(58) Field of Classification Search
CPC .... G06F 3/0604; G06F 3/0611; G06F 3/0658; G06F 3/0659; G06F 3/0673; G06F 11/1008; G06F 11/1076; G06F 12/0246
USPC ........................................................ 714/764
See application file for complete search history.

(56) References Cited

U.S. PATENT DOCUMENTS

| | | | | |
|---|---|---|---|---|
| 2001/0043210 A1* | 11/2001 | Gilbert | ...................... | G06F 3/14 707/E17.109 |
| 2014/0281151 A1* | 9/2014 | Yu | .......................... | G11C 29/52 711/103 |
| 2018/0144806 A1* | 5/2018 | Song | ....................... | G11C 16/16 |
| 2019/0146911 A1* | 5/2019 | Ha | ....................... | G06F 12/0246 711/103 |
| 2020/0117389 A1* | 4/2020 | Kang | .................... | G06F 3/0656 |

FOREIGN PATENT DOCUMENTS

KR 10-2011-0126894 A 11/2011
KR 10-2016-0064364 A 6/2016

\* cited by examiner

*Primary Examiner* — Albert Decady
*Assistant Examiner* — Enamul M Kabir
(74) *Attorney, Agent, or Firm* — Perkins Coie LLP

(57) ABSTRACT

A memory system may include: one or more memory devices each including a plurality of memory cells for storing data; a memory for storing meta data associated with the stored data; and a memory controller in communication with the memory and the one or more memory devices and for loading the meta data from the memory, and generating first meta page based on the meta data according to a first layout, and storing the first meta page in the memory device.

20 Claims, 14 Drawing Sheets

MEMORY SYSTEM AND METHOD FOR OPERATING MEMORY CONTROLLER INCLUDED THEREIN

CROSS-REFERENCE TO RELATED APPLICATION

This patent document claims priority to and benefits of the Korean patent application number 10-2020-0100162, filed on Aug. 10, 2020, which is incorporated herein by reference in its entirety.

TECHNICAL FIELD

Various implementations of the disclosed technology generally relate to a memory system, and more particularly, to a memory system and a method for operating a memory controller included therein.

BACKGROUND

Storage devices refer to electronic components that are configured to store data on a permanent or temporary basis. Each storage device may include one or more storage medium to store data and operate based on a request from a host device such as a computer or a smart phone. The storage device may include a storage medium for storing data and may further include a memory controller for controlling the storage medium to store or retrieve data. The storage device can be classified based on the type of storage medium. For example, the memory device used as a storage medium is classified into a volatile memory device and a nonvolatile memory device.

A volatile memory device may store data only when power is supplied. Thus, such a volatile memory device loses its data in the absence of power. Examples of the volatile memory device include a Static Random Access Memory (SRAM) or a Dynamic Random Access Memory (DRAM).

A nonvolatile memory device is a memory device that can retain its data even in the absence of power. Examples of the nonvolatile memory device include a Read Only Memory (ROM), a Programmable ROM (PROM), an Electrically Programmable ROM (EPROM), an Electrically Erasable ROM (EEROM), or a flash memory.

SUMMARY

Embodiments provide a memory system capable of enhancing the storage speed of meta data and a method for operating a memory controller included in the memory system.

In an aspect of the disclosed technology, a memory system is provided to include: one or more memory devices each including a plurality of memory cells for storing data; a memory configured to store meta data associated with the stored data; and a memory controller in communication with the memory and the one or more memory devices and configured to load the meta data from the memory, and generate a first meta page based on the meta data according to a first layout, and store the first meta page in the memory device.

The memory controller may receive a request from a host and generate a second the meta page based on a second layout different from the first layout in response to the request from the host.

In another aspect of the disclosed technology, a method for operating a memory controller is provided. The method includes: receiving a request from a host in communication with the memory controller storing a first meta page generated during a runtime operation based on a first layout; reading meta data stored in a memory in response to the request; obtaining at least one meta slice by dividing the meta data; generating a second meta page including the at least one meta slice based on a second layout different from a first layout; and storing the second meta page in at least one memory device in communication with the memory controller.

BRIEF DESCRIPTION OF THE DRAWINGS

Example embodiments will now be described more fully hereinafter with reference to the accompanying drawings; however, they may be embodied in different forms and should not be construed as limited to the embodiments set forth herein.

In the drawing figures, dimensions may be exaggerated for clarity of illustration. It will be understood that when an element is referred to as being "between" two elements, it can be the only element between the two elements, or one or more intervening elements may also be present. Like reference numerals refer to like elements throughout.

DETAILED DESCRIPTION

The specific structural or functional description disclosed herein is merely illustrative for the purpose of describing embodiments according to the concept of the disclosed technology. The embodiments according to the concept of the disclosed technology can be implemented in various forms, and cannot be construed as limited to the embodiments set forth herein.

Figure 1:
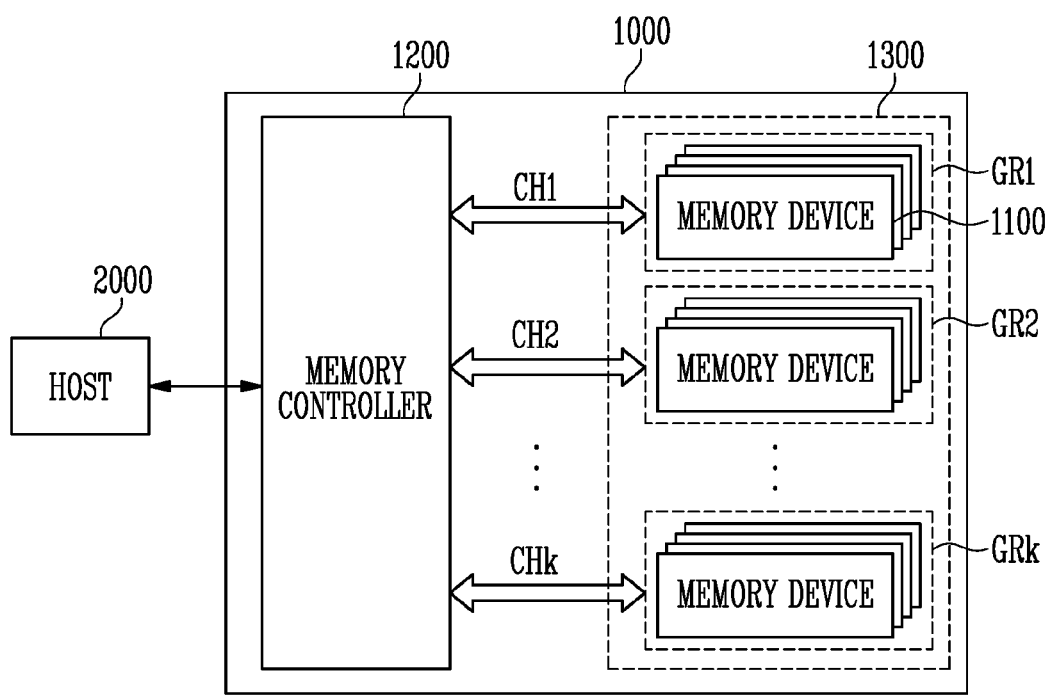
FIG. 1 is a diagram illustrating a memory system in accordance with an embodiment of the disclosed technology.

FIG. 1 is a diagram illustrating a memory system in accordance with an embodiment of the disclosed technology.

Referring to FIG. 1, the memory system 1000 may include a memory device 1100 in which data is stored and/or a memory controller 1200 which controls the memory device 1100 based on a request from a host 2000.

The host 2000 may communicate with the memory system 1000 by using at least one of various communication schemes, such as a Universal Serial bus (USB), a Serial AT Attachment (SATA), a High Speed InterChip (HSIC), a Small Computer System Interface (SCSI), Firewire, a Peripheral Component Interconnection (PCI), a PCI express (PCIe), a nonvolatile memory express (NVMe), a universal flash storage (UFS), a Secure Digital (SD), a Multi-Media Card (MMC), an embedded MMC (eMMC), a Dual In-line Memory Module (DIMM), a Registered DIMM (RDIMM), or a Load Reduced DIMM (LRDIMM).

The memory device 1100 may be implemented as a volatile memory device in which data disappears when the supply of power is interrupted or a nonvolatile memory device in which data is retained even when the supply of power is interrupted. The memory device 1100 may perform a program operation, a read operation, or an erase operation under the control of the memory controller 1200. For example, in the program operation, the memory device 1100 may receive a command, an address, and data, which are input from the memory controller 1200, and perform the program operation. In the read operation, the memory device 1100 may receive a command and an address, which are input from the memory controller 1200, and output, to the memory controller 1200, data stored at a position (e.g., a physical address) corresponding to the input address. The memory device 1100 is an individual Integrated Chip (IC) on which device processing is completely performed, and may be designated as a chip or a die.

The memory system 1000 may include a plurality of memory devices 1100, and the plurality of memory devices may be grouped into a plurality of memory device groups 1300 according to a channel connected to the memory controller 1200. For example, memory devices connected to the memory controller 1200 through a first channel CH1 among the memory devices may be designated as a first group GR1, and memory devices connected to the memory controller 1200 through a second channel CH2 among the memory devices may be designated as a second group GR2. Although a case where one group includes a plurality of memory devices has been illustrated in FIG. 1, one group may include a single memory device 1100.

The memory controller 1200 may control overall operations of the memory system 1000, and control data exchange between the host 2000 and the memory device 1100. For example, when a command is received from the host 2000, the memory controller 1200 may control memory device groups 1300 connected to each of channels CH1 to CHk according to the received command. The memory controller 1200 may program, read or erase data by controlling the memory device groups 1300 connected to each channel according to a request from the host 2000.

Figure 2:
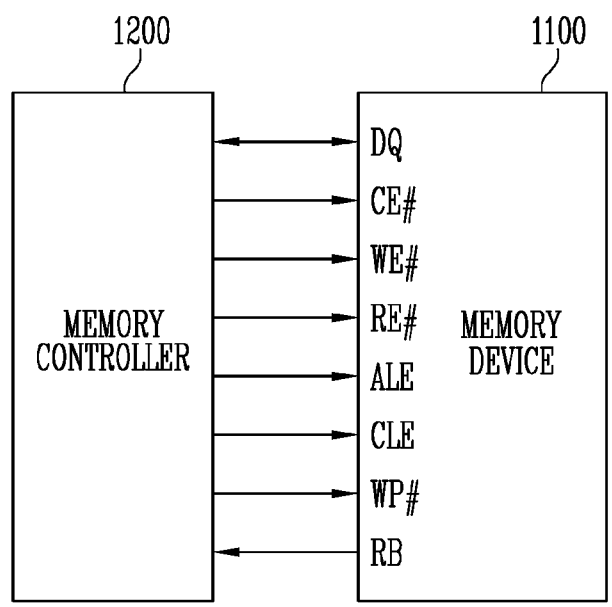
FIG. 2 is a diagram illustrating signals exchanged between a memory controller and a memory device, which are shown in FIG. 1.

FIG. 2 is a diagram illustrating signals exchanged between the memory controller and the memory device, which are shown in FIG. 1.

Referring to FIG. 2, the memory controller 1200 and the memory device 1100 may exchange a command, data, and/or an address through an input/output pad DQ. For example, the input/output pad DQ may be configured with 8 lines, to transmit/receive 8-bit data, and each line may transmit/receive 1-bit data.

The memory device 1100 may receive a chip enable signal through a CE # pad, receive a write enable signal through a WE # pad, receive a read enable signal through a RE # pad, receive an address latch enable signal through an ALE pad, receive a command latch enable signal through a CLE pad, and receive a write protection signal through a WP # pad.

The address latch enable signal may be a signal with which the memory controller 1200 instructs the memory device 1100 to load an address provided to the memory device 1100 through the input/output pad DQ to an address register. The chip enable signal may be a signal with which the memory controller 1200 instructs the memory device 1100 so as to enable or disable one or more memory devices. The command latch enable signal may be a signal with which the memory controller 1200 instructs the memory device 1100 to load a command provided to the memory device 1100 through the input/output pad DQ to a command register. The read enable signal may be a signal with which the memory controller 1200 instructs the memory device 1100 to transmit data to the memory controller 1200. The write enable signal may be a signal for informing that a command, an address, and data are transferred.

The memory device 1100 may output a ready-busy signal to the memory controller 1200 through an RB pad. The ready-busy signal may indicate whether a memory array of the memory device 1100 is in a busy state or an idle state.

Although a connection relationship between one memory device 110 and the memory controller 1200 has been illustrated in FIG. 2, the input/output pad DQ, the CE # pad, the WE # pad, the RE # pad, the ALE pad, the CLE pad, and the WP # pad may form one of the channels CH1 to CHk, and one of the memory device groups 1300 may be connected to the memory controller 1200 through the formed channel.

Therefore, when the memory controller 1200 transmits a command, data, and/or an address through an input/output pad DP included in one channel, all memory devices 1100 belonging to a group connected to the corresponding channel or a memory device 1100 selected by the memory controller 1200 in the group connected to the corresponding channel may receive the command, the data, and/or the address. For example, the memory controller 1200 may transmit a status read command to memory devices 1100 through an input/output pad DQ corresponding to the first channel CH1, and at least one of the memory devices in the first group GR1 connected to the first channel GR1 may transmit status information to the input/output pad DQ in response to the status read command.

Figure 3:
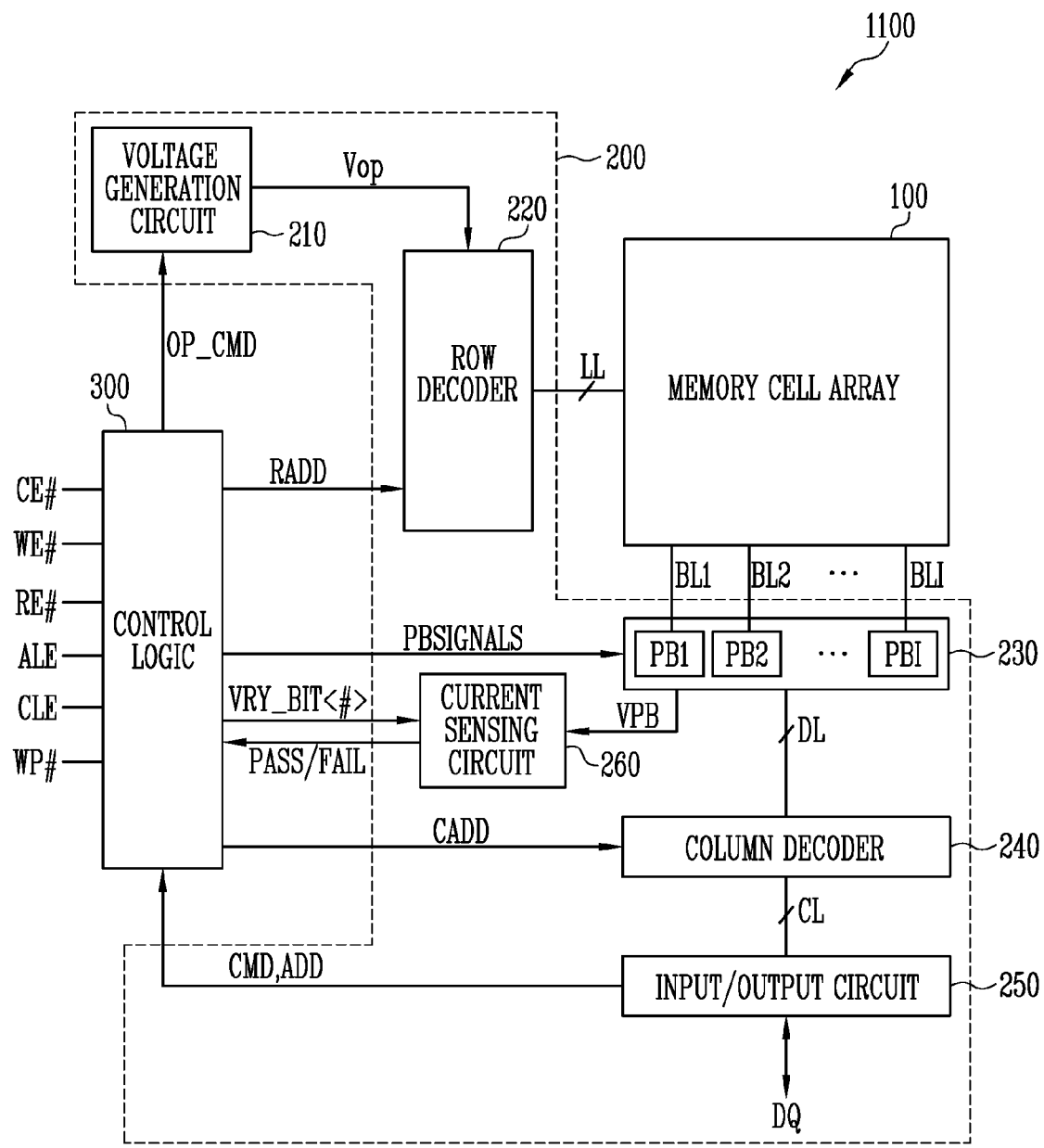
FIG. 3 is a diagram illustrating in detail the memory device shown in FIG. 1.

FIG. 3 is a diagram illustrating in detail the memory device shown in FIG. 1.

The memory device 1100 may be implemented as a volatile memory device or a nonvolatile memory device. For example, the memory device 1100 may be one of a volatile memory device such as a Dynamic Random Access Memory (DRAM) or a Static RAM (SRAM) and a nonvolatile memory device such as a Read Only Memory (ROM), a Mask ROM (MROM), a Programmable ROM (PROM), an Erasable ROM (EROM), an Electrically Erasable ROM (EEROM), a Ferromagnetic ROM (FROM), a Phase change RAM (PRAM), a Resistive RAM (RRAM), or a flash memory. In FIG. 3, a nonvolatile memory device will be illustrated as an example.

The memory device 1100 may include a memory cell array 100 in which data is stored. The memory device 1100 may include peripheral circuits 200 configured to perform a program operation for storing data in the memory cell array 100, a read operation for outputting stored data, and an erase operation for erasing stored data. The memory device 1100 may include a control logic 300 which controls the peripheral circuits 200 under the control of the memory controller 1200.

The memory cell array 100 includes a plurality of memory cells in which data is stored. For example, the memory cell array 100 may include at least one plane, and the plane may include one or more memory blocks. In an embodiment, the plane may be a unit of a memory area accessed when a program, read or erase operation is performed. Each of the memory blocks may include a plurality of memory cells. A structure in which a plurality of planes are included may be designated as a multi-plane structure. User data and information necessary for an operation of the memory device 1100 may be stored in the memory blocks. The memory blocks may be implemented in a two-dimensional or three-dimensional structure. The memory blocks having the two-dimensional structure may include memory cells arrange in parallel to a substrate, and the memory blocks having the three-dimensional structure may include memory cells stacked vertically to a substrate.

The peripheral circuits 200 may be configured to perform program, read, and erase operations under the control of the control logic 300. For example, the peripheral circuits 200 may include a voltage generation circuit 210, a row decoder 220, a page buffer group 230, a column decoder 240, an input/output circuit 250, and a current sensing circuit 260.

The voltage generation circuit 210 may generate various operating voltages Vop used for program, read, and erase operations in response to an operation signal OP_CMD output from the control logic 300. For example, the voltage generation circuit 210 may generate various voltages such as a program voltage, a verify voltage, a pass voltage, a read voltage, and an erase voltage under the control of the control logic 300.

The row decoder 220 may supply the operating voltages Vop to local lines LL connected to a selected memory block among the memory blocks of the memory cell array 100 in response to a row address RADD output from the control logic 300. The local lines LL may include local word lines, local drain select lines, and/or local source select lines. In addition, the local lines LL may include various lines connected to the memory block, such as a source line.

The page buffer group 230 may be connected to bit lines BL1 to BLI connected to the memory blocks of the memory cell array 100. The page buffer group 230 may include a plurality of page buffers PB1 to PBI connected to the bit lines BL1 to BLI. The page buffers BP1 to BPI may operate in response to page buffer control signals PBSIGNALS output from the control logic 300. For example, the page buffers PB1 to PBI may temporarily store data receive through the bit lines BL1 to BLI, or sense voltages or currents of the bit lines BL1 to BLI in a read or verify operation.

The column decoder 240 may transfer data between the input/output circuit 250 and the page buffer group 230 in response to a column address CADD output from the control logic 300. For example, the column decoder 240 may exchange data with the page buffers PB1 to PBI through data lines DL, or exchange data with the input/output circuit 250 through the column lines CL.

The input/output circuit 250 may receive a command CMD, an address ADD, and data from the controller 1200 through an input/output pad DQ, and output data read from the memory cell array 100 to the memory controller 1200 through the input/output pad DQ. For example, the input/output circuit 250 may transfer the command CMD and the address ADD, which are received from the memory controller 1200, to the control logic 300, or exchange data DATA with the column decoder 240.

In a read operation or a verify operation, the current sensing circuit 260 may generate a reference current in response an allow bit VRY_BIT<#>, and output a pass signal PASS or a fail signal FAIL by comparing a reference voltage generated by the reference current with a sensing voltage VPB received from the page buffer group 230.

The control logic 300 may receive a command CMD and an address ADD in response to signals received through CE #, WE #, RE #, ALE, CLE, and WP # pads. The control logic 300 may generate control signals for the peripheral circuits 200 and output the generated control signals to the peripheral circuits 200, in response to that the control logic 300 has received the command CMD and the address ADD. For example, the control signals may include at least one of the operation signal OP_CMD, the row address RADD, the page buffer control signals PBSIGNALS, and the allow bit VRY_BIT<#>. The control logic 300 may output the operation signal OP_CMD to the voltage generation circuit 210, output the row address RADD to the row decoder 220, output the page buffer control signals PBSIGNALS to the page buffer group 230, and output the allow bit VRY_BIT<#> to the current sensing circuit 260. Also, the control logic 300 may determine whether a verify operation has passed or failed in response to the pass signal PASS or the fail signal FAIL.

Figure 4:
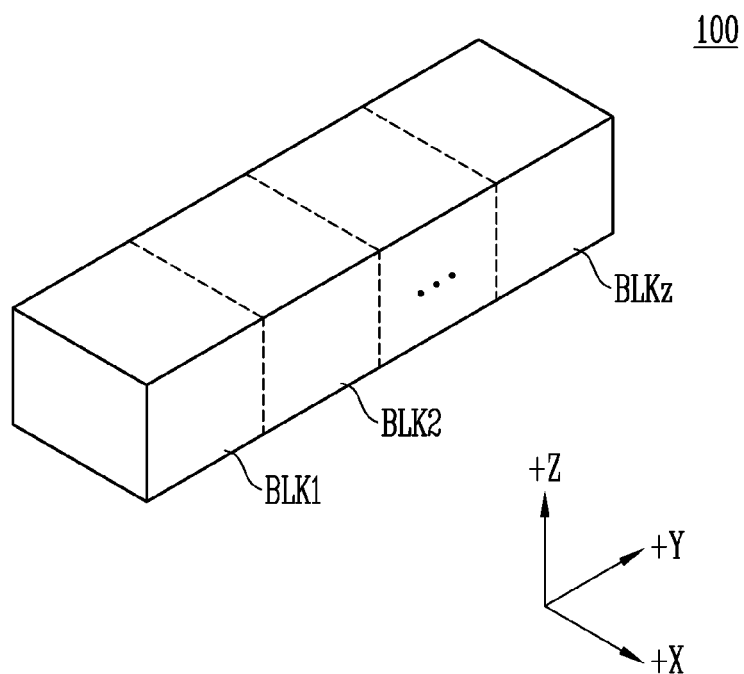
FIG. 4 is a diagram illustrating an embodiment of a memory cell array shown in FIG. 3.

FIG. 4 is a diagram illustrating an embodiment of the memory cell array shown in FIG. 3.

Referring to FIG. 4, the memory cell array 100 may include a plurality of memory blocks BLK1 to BLKz. Each memory block may have a three-dimensional structure. Each memory block may include a plurality of memory cells stacked on a substrate (not shown). The plurality of memory cells may be arranged along +X, +Y, and +Z directions.

Figure 5:
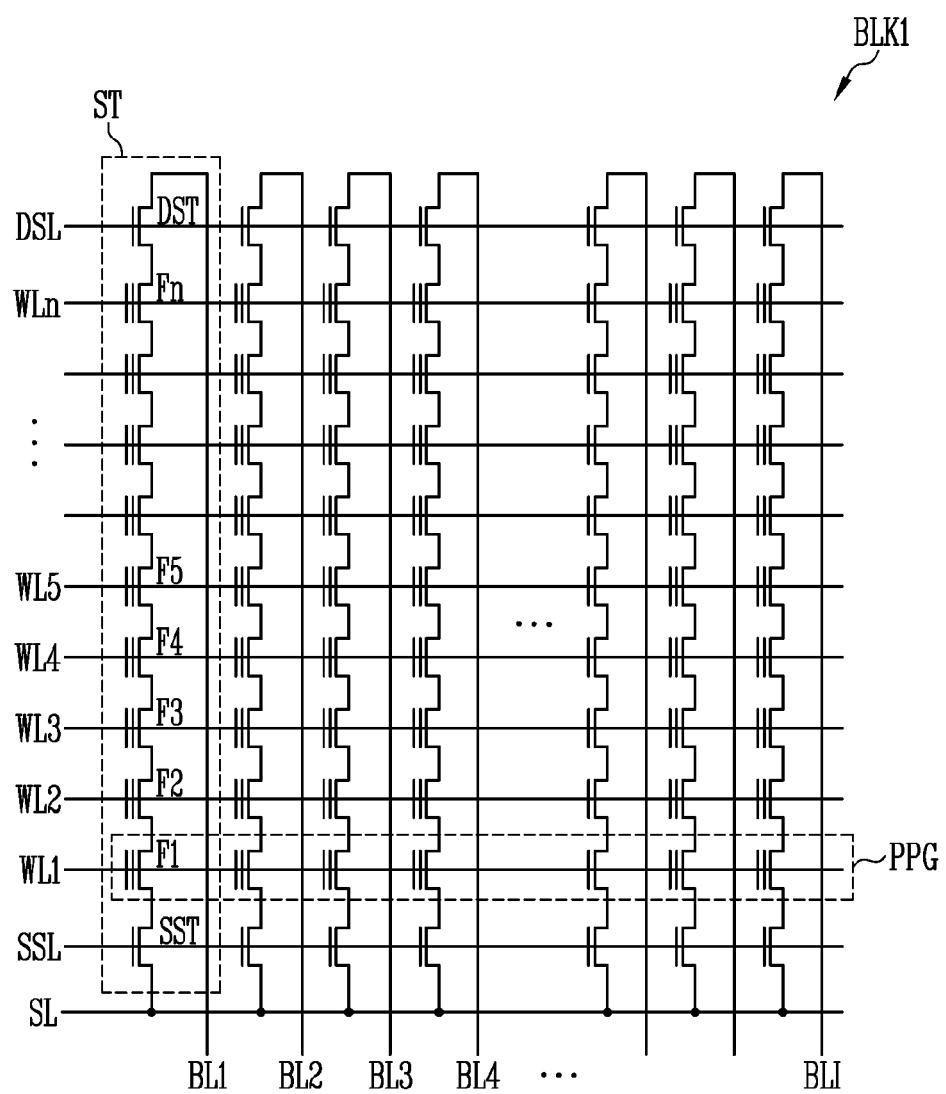
FIG. 5 is a diagram illustrating a memory block shown in FIG. 4.

FIG. 5 is a diagram illustrating the memory block shown in FIG. 4.

Referring to FIG. 5, a first memory block BLK1 among the plurality of memory blocks BLK1 to BLKz shown in FIG. 4 is exemplarily illustrated. The other memory blocks BLK2 to BLKz may have the same form as the first memory block BLK1.

The first memory block BLK1 may include a plurality of cell strings ST connected between bit lines BL1 to BLI and a source line SL. For example, the cell strings ST may be respectively connected to the bit lines BL1 to BLI, and be commonly connected to the source line SL. Since the cell strings ST are configured similarly to each other, a cell string ST connected to a first bit line BL1 among the cell strings ST will be described as an example.

The cell string ST may include a source select transistor SST, first to nth memory cells F1 to Fn (n is a positive integer), and a drain select transistor DST, which are connected in series to each other between the source line SL and the first bit line BL1. A number of source and drain select transistors SST and DST is not limited to that shown in FIG. 5. The source select transistor SST may be connected between the source line SL and the first memory cell F1. The first to nth memory cells F1 to Fn may be connected in series to each other between the source select transistor SST and the drain select transistor DST. The drain select transistor DST may be connected between the nth memory cell Fn and the first bit line BL1. Although not shown in the drawing, dummy cells may be further connected between the memory cells F1 to Fn or between the source select transistor SST and the drain select transistor DST.

Gates of source select transistors SST included in different cell strings ST may be connected to a source select line SSL, gates of first to nth memory cells F1 to Fn included in different cell strings ST may be connected to first to nth word lines WL1 to WLn, and gates of drain select transistors DST included in different cell strings ST may be connected to a drain select lines DSL. A group of memory cells connected to each of the word lines WL1 to WLn may be referred to as a page PG. For example, a group of first memory cells F1 connected to a first word line WL1 among memory cells F1 to Fn included in different strings may become one physical page PPG. Program and read operations may be performed in a physical page PPG unit.

Figure 6:
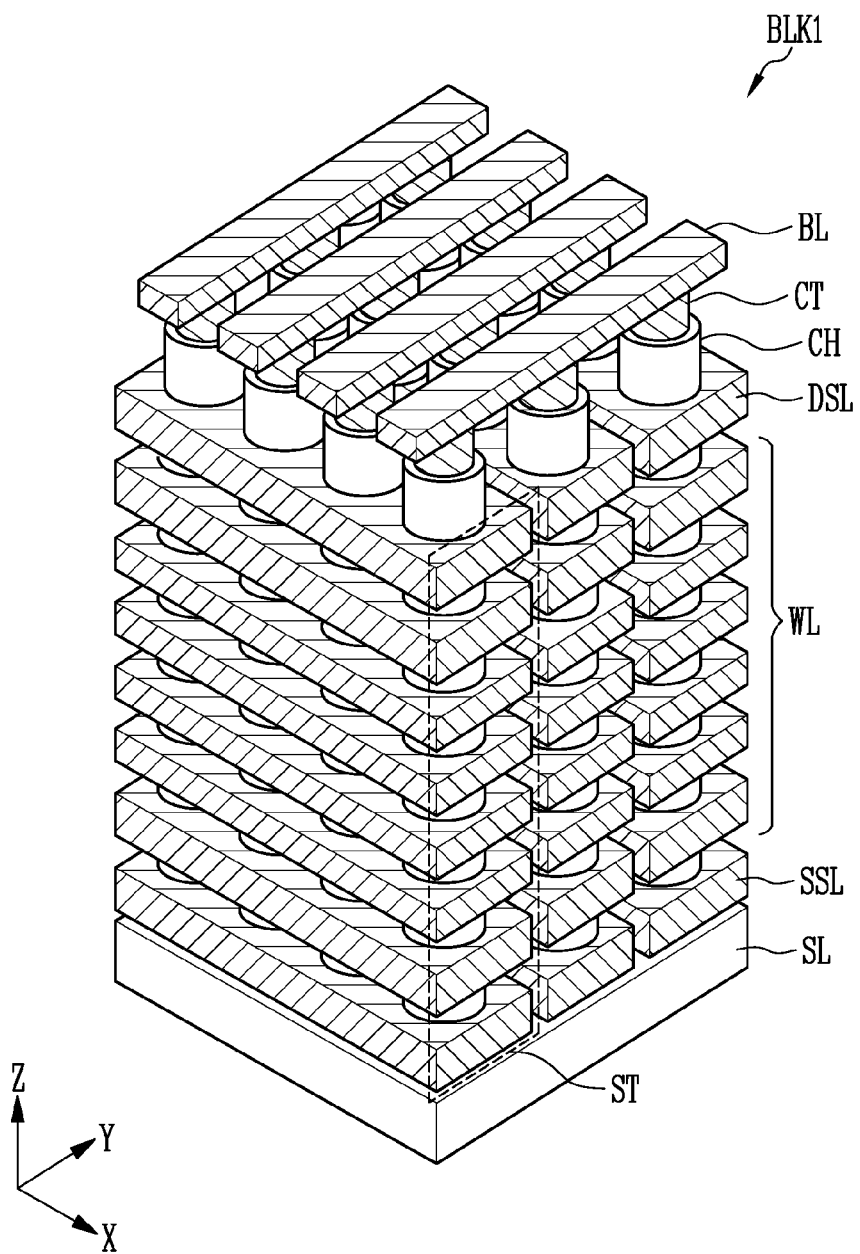
FIG. 6 is a diagram illustrating an embodiment in which the memory block shown in FIG. 4 is configured in three-dimensions.

FIG. 6 is a diagram illustrating an embodiment in which the memory block shown in FIG. 4 is three-dimensionally configured.

Referring to FIG. 6, the first memory block BLK1 among the plurality of memory blocks BLK1 to BLKz shown in FIG. 4 is exemplarily illustrated. The other memory blocks BLK2 to BLKz may have the same form as the first memory block BLK1.

The first memory block BLK implemented in a three-dimensional structure may be formed in a I shape in a vertical direction (Z direction) on a substrate, and include a plurality of cell strings ST arranged between bit lines BL and a source line SL. Alternatively, a well may be formed instead of the source line SL. This structure may also be referred to as a Bit Cost Scalable (BiCS) structure. For example, when the source line SL is horizontally formed above the substrate, the cell strings ST having the BiCS structure may be formed in the vertical direction (Z direction) above the source line SL.

In some implementations, the cell strings ST may be arranged in a first direction (X direction) and a second direction (Y direction). The cell strings ST may include source select lines SSL, word lines WL, and drain select lines DSL, which are stacked to be spaced apart from each other. A number of the source select lines SSL, the word lines WL, and the drain select lines DSL is not limited to that shown in the drawing, and may be changed according to the memory device 1100. The cell strings ST may include vertical channel layers CH vertically penetrating the source select lines SSL, the word lines WL, and the drain select lines DSL, and the bit lines BL which are in contact with the top of the vertical channel layers CH protruding upwardly of the drain select lines DSL and extend in the second direction (Y direction). Memory cells may be formed between the word lines WL and the vertical channel layers CH. A contact plug CT may be further formed between the bit lines BL and the vertical channel layers CH.

Figure 7:
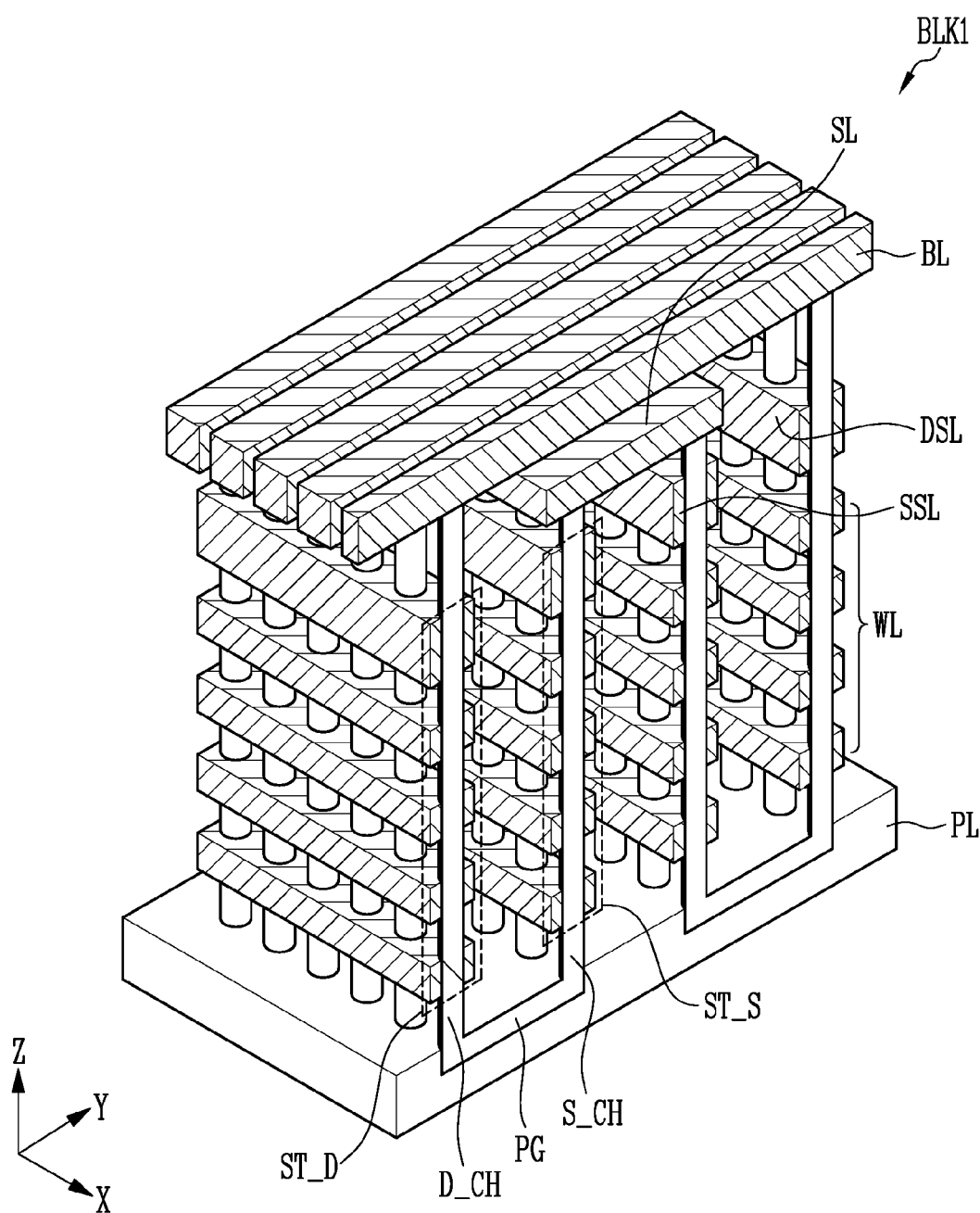
FIG. 7 is a diagram illustrating another embodiment in which the memory block shown in FIG. 4 is configured in three-dimensions.

FIG. 7 is a diagram illustrating another embodiment in which the memory block shown in FIG. 4 is three-dimensionally configured.

Referring to FIG. 7, the first memory block BLK1 among the plurality of memory blocks BLK1 to BLKz shown in FIG. 4 is exemplarily illustrated. The other memory blocks BLK2 to BLKz may have the same form as the first memory block BLK1.

The first memory block BLK1 implemented in a three-dimensional structure may be formed in a U shape in a vertical direction (Z direction) on a substrate, and include source strings ST_S and drain strings ST_D, which are connected between bit lines BL and a source line SL and form a pair. The source strings ST_S and the drain strings ST_D may be connected to each other through a pipe gate PG, to constitute a U structure. The pipe gate PG may be formed in a pipe line PL. More specifically, the source strings ST_S may be vertically formed between the source line SL and the pipe line PL, and the drain strings ST_D may be vertically formed between the bit lines BL and the pipe line PL. This structure may also be referred to as a Pipe-shaped Bit Cost Scalable (P-BiCS) structure.

More specifically, the drain strings ST_D and the source strings ST_S may be arranged in a first direction (X direction) and a second direction (Y direction), and be alternately arranged along the second direction (Y direction). The drain strings ST_D may include word lines WL and a drain select line DSL, which are stacked to be spaced apart from each other, and drain vertical channel layers D_CH vertically penetrating the word lines WL and the drain select line DSL. The source strings ST_S may include word lines WL and a source select lines SSL, which are stacked to be spaced apart from each other, and source vertical channel layers S_CH vertically penetrating the word lines WL and the source select line SSL. The drain vertical channel layers D_CH and the source vertical channel layers S_CH may be connected to each other by the pipe gate PG in the pipe line PL. The bit lines BL may in contact with the top of the drain vertical channel layers D_CH protruding upwardly of the drain select line DSL, and extend in the second direction (Y direction).

Figure 8:
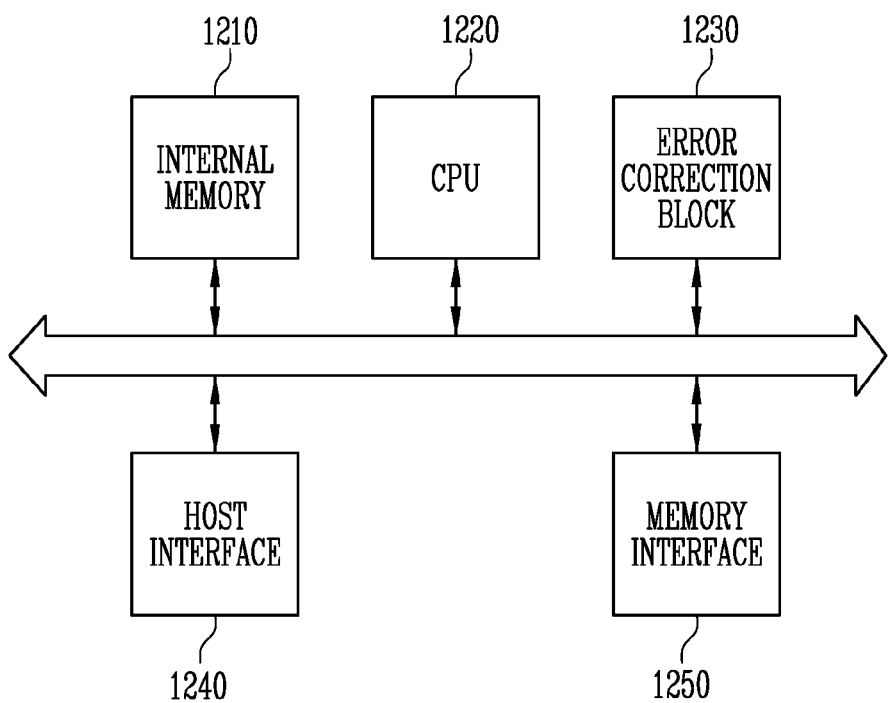
FIG. 8 is a block diagram illustrating a structure of the memory controller shown in FIG. 1.

FIG. 8 is a block diagram illustrating a structure of the memory controller shown in FIG. 1.

Referring to FIG. 8, the memory controller 1200 may include an internal memory 1210, a Central Processing Unit (CPU) 1220, an error correction block 1230, a host interface 1240, and a memory interface 1250.

The internal memory 1210 may store various information which are necessary for an operation of the memory controller 1200 or which memory controller 1200 may refer to so as to control the memory device 1100. For example, the internal memory 1210 may store user data (or referred to as normal data) received from the host 2000. The internal memory 1210 may further store meta data required for performing a program operation, a read operation, and an erase operation, and/or a background operation. Meta data is data that contains information on the actual user data that is stored to facilitate management and control of the storage and retrieval of the data. For example, meta data may indicate how data is stored on memory, or the time of the last of access to the data. The background operation may be performed in a background to maintain or repair the memory device 1100 and include a garbage collection operation, a wear leveling operation, etc. The internal memory 1210 may further store journal data indicating a change in the meta data. The meta data may be used to refer to all other data except the user data and the journal data.

In an embodiment, the internal memory 1210 may be implemented as a volatile memory. For example, the internal memory 1210 may include a Double Data Rate Synchronous Dynamic Random Access Memory (DDR SDRAM), a Low Power Double Data Rate4 (LPDDR4) SDRAM, a Graphics Double Data Rate (GDDR) SDRAM, a Low Power DDR (LPDDR), or a Rambus Dynamic Random Access Memory (RDRAM).

The CPU 1220 may perform various calculations for controlling the memory device 1100 or generate various commands. When the CPU 1220 receives a request from the host 2000, the CPU 1220 may generate a command corresponding to the received request, and transmit the generated command to the memory device 1100. The CPU 1220 may driver firmware referred to as a Flash Translation layer (FTL) so as to control the memory device 1100. The FTL may manage a logical address and a physical address. For example, the FTL may receive data and a logical address, which are input from the host 2000, and translate the logical address into a physical address indicating an area in which data is to be actually stored in the memory device 1100. The FTL may manage a mapping relationship between the logical address and the physical address in a page unit or a block unit. In order to manage the mapping relationship, the FTL may generate an address mapping table (including a logical-to-physical mapping table (L2P table) and/or a physical-to-logical mapping table (P2L table)) which defines the mapping relationship, and store the address mapping table in the internal memory. Hereinafter, an operation of the FTL, which is included in an operation of the memory controller 1200, will be described.

The error correction block 1230 may detect and correct an error of data received from the memory device 1100 by using an Error Correction Code (ECC). The CPU 1220 may adjust a read voltage based on an error detection result, and control the memory device 1100 to repeat reading using the adjusted read voltage. In an exemplary embodiment, the error correction block 1230 may be provided as a component of the memory controller 1200.

The host interface 1240 may exchange various communications including a command, an address, and/or data between the memory controller 1200 and the host 2000. For example, the host interface 1240 may receive a request, an address, and/or data from the host 2000, and output data read from the memory device 1100 to the host 2000. The host interface 1240 may communicate with the host 2000 by using a protocol such as Peripheral Component Interconnect express (PCIe), Advanced Technology Attachment (ATA), Serial ATA (SATA), Parallel ATA (PATA), Serial Attached SCSI (SAS), or Non-Volatile Memory express (NVMe). The host interface 1240 is not limited to the above-described example, and may include various interfaces such as a Universal Serial Bus (USB), a Multi-Media Card (MMC), an Enhanced Small Disk Interface (ESDI), or an Integrated Drive Electronics (IDE).

The memory interface 1250 may exchange a command, an address, and/or data between the memory controller 1200 and the memory device 1100. For example, the memory interface 1250 may transmit a command, an address, and/or data to the memory device 1100 through a channel, and receive data, etc. from the memory device 1100.

The internal memory 1210 may be used as a cache memory or a working memory in the memory system 1000. Although FIG. 8 shows a case where the internal memory 1210 is located inside of the memory controller 1200, other implementations are also possible. For example, the internal memory 1210 may be located separately from the memory controller 1200 and the memory device 1100. In this case, the internal memory 1210 may be connected to the memory controller 1200 through an internal memory interface (not shown).

Figure 9:
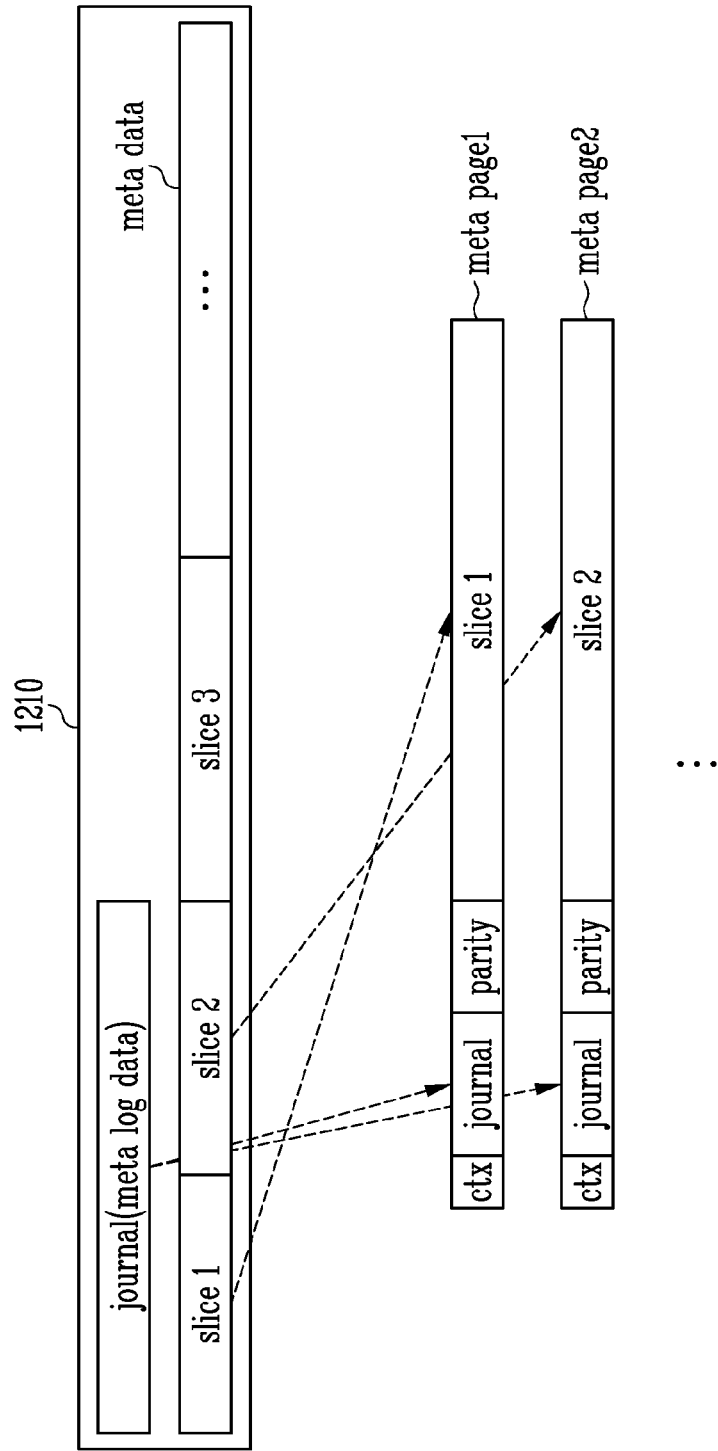
FIG. 9 is a diagram illustrating a meta page generated according to a first layout in accordance with an embodiment of the disclosed technology.

FIG. 9 is a conceptual diagram illustrating a method for generating a meta page from meta data in accordance with an embodiment of the disclosed technology.

The memory controller 1200 may generate meta data while performing an operation according to a request received from the host 200 or performing a background operation. When a change in the generated meta data occurs, the memory controller 1200 may generate journal data indicating the change. When a change in the meta data occurs, the memory controller 1200 may update the meta data and the journal data. The meta data and the journal data, which are generated or updated, may be stored in the internal memory 1210. The journal data may include information indicating a kind or type of operation in which the change in the meta data occurs and information for recovering the meta data, and such journal data may be referred to as meta log data. Herein, the internal memory may also be referred to as a memory.

For example, the meta data may include at least one of an address mapping table, a bad block table indicating a bad block among blocks of the memory device 1100, a read count table (RCT) indicating a number of times a block or page of the memory device 1100 is read, an erase count table (ECT) indicating a number of times the block or page is erased, a valid page table (VPT) indicating valid pages (or a number thereof) in the block, or a trim bit map indicating whether a data block matched to each bit in a trim operation is to be used. While the meta data has a relatively large size, only a portion of the meta data is frequently changed. Thus, by indicating a change in the meta data using the journal data, it is possible to avoid or reduce a load for updating the entire meta data.

When the internal memory 1210 is a volatile memory, the memory controller 1200 may generate at least one meta page including metal data and journal data that are stored in the internal memory 1210. The memory controller 1200 may store the generated at least one meta page in the memory device 1100. With the at least one meta page, it is possible to continuously maintain the meta data and the journal data, and. In some implementations, the memory controller 1200 may translate the meta data and the journal data into at least one meta page form, and store the at least one meta page form in the memory device 1100. This storage operation may be performed periodically (or when a specific condition is satisfied such as when an idle space of the internal memory 1210 reaches a threshold value or less) during a runtime period of the memory system 1000, or be performed in shutdown or sudden power-off (SPO) of the memory system 1000, an operation of updating firmware of the memory controller 1200, a format operation on the memory device 1100, or a sanitization operation.

The meta data stored in at least one meta page form in the memory device 1100 may be re-loaded to and used in the internal memory 1210 by the memory controller 1200 from the memory device 1100 in a power-on operation after shutdown, firmware update completion, format completion, or sanitization completion. For example, the memory controller 1200 may read the at least one meta page stored in the memory device 1100, rebuild the meta data by combining metal slices included in the read meta page, and load the rebuilt meta data to the internal memory 1210.

In order to store the meta data and the journal data in the memory device 1100, the memory controller 1200 may read the meta data stored in the internal memory 1210, and divide the meta data into at least one meta slices slice1, slice2, slice3, and so on. Next, the memory controller 1200 may generate at least one meta page including the at least one meta slice. The memory controller 1200 may generate the meta page, based on a predetermined layout (hereinafter "first layout").

For example, the meta page according to the first layout may have a form including a single meta slice among the meta slices that are acquired by dividing the meta data. As shown in FIG. 9, a first meta page (meta page1) according to the first layout may have a form including a first meta slice (slice1) and the journal data. In addition, a second meta page (meta page2) may have a form including a second meta slice (slice2) and the journal data.

In some implementations, the meta page according to the first layout may further include at least one of a parity data for recovering an error of the meta data and context data ctx. The context data ctx may include information that needs to be stored by the FTL and has a size relatively smaller than that of the meta data. Due to the small size, it is unnecessary to use the journal data to indicate a partial change of the context data ctx. For example, the context data ctx may include a write pointer indicating a program position in a super block, a kind or type of operation being performed before a shutdown operation, a number of processed operation, etc. The context data ctx and the parity data may be generated during a runtime operation of the FTL and be stored in the internal memory 1210. The parity data and the context data ctx may have a predetermined size. Therefore, the parity data and the context data ctx may occupy an area having a fixed size of the entire area of the meta page.

The memory controller 1200 may generate the first meta page (meta page1) according to the first layout and then store the first meta page (meta page1) in the memory device 1100, and generate the second meta page (meta page2) according to the first layout and then store the second meta page (meta page2) in the memory device 1100. The memory controller 1200 may repeat, for each meta slice, a process of generating a meta page and storing the meta page in the memory device 1100.

A portion of the meta page has a size to include the journal data, the parity data, and the context data ctx. The remaining portion of the meta page has a size to include a corresponding meta slice. The total size of the meta page may correspond to a size of a super page (S-page) which will be described later, or to a predetermined size.

As shown in FIG. 9, the meta page according to the first layout may have a form including the journal data. However, in some operations including the shutdown operation, since the meta data may be not changed or initialized, the journal data may not be updated. Therefore, it may be unnecessary to store, in the memory device 1100, the journal data together with the meta data in a meta page form.

For example, when a shutdown request is received from the host 2000, the meta data may not be changed. Therefore, the memory controller 1200 may store the meta data stored in the internal memory 1210 in a meta page form in the memory device 1100, without updating the journal data, and shut down the memory system 100.

For example, when a firmware update request is received from the host 2000, the meta data may not be changed. Therefore, the memory controller 1200 may store the meta data stored in the internal memory 1210 in a meta page form in the memory device 1100, without updating the journal data, and update firmware driven by the memory controller 1200.

In another example, when a format request for requesting initialization of the address mapping table is received from the host 2000, it is unnecessary to record a change in the meta data as the journal data even when the meta data is changed. Therefore, the memory controller 1200 may initialize the address mapping table included in the meta data, without updating the journal data, and store, in the memory device, the meta data including the initialized address mapping table in a meta page form, in response to the format request.

Similarly to the format request, it is unnecessary to record a change in the meta data as the journal data, even when a sanitization request for requesting physical deletion of data recorded in the memory device 1100 is received from the host 2000. Therefore, the memory controller 1200 may initialize the address mapping table included in the meta data, without updating the journal data, erase all the data recorded in the memory device 1100, and store, in the memory device, the meta data including the initialized address mapping table in a meta page form.

A response of the memory controller 1200 to the above-described requests may include an operation of storing the meta data stored in the internal memory 1210 in the memory device 1100. In this case, since the journal data is not updated, it may be unnecessary to store journal data stored in the internal memory 1210 in the memory device 1100. Although the journal data is not stored in the memory device 1100, the memory controller 1200 may acquire and use the journal data which was previously stored in the memory device 1100 in the runtime operation, if necessary. Thus, when it is unnecessary to update the journal data, the memory controller 1200 generates a meta page without journal data and stores the generated meta page in the memory device 1100, so that the storage speed of the meta page can be enhanced. The meta page generated without the journal data is different from the meta page generated according to the first layout.

Figure 10:
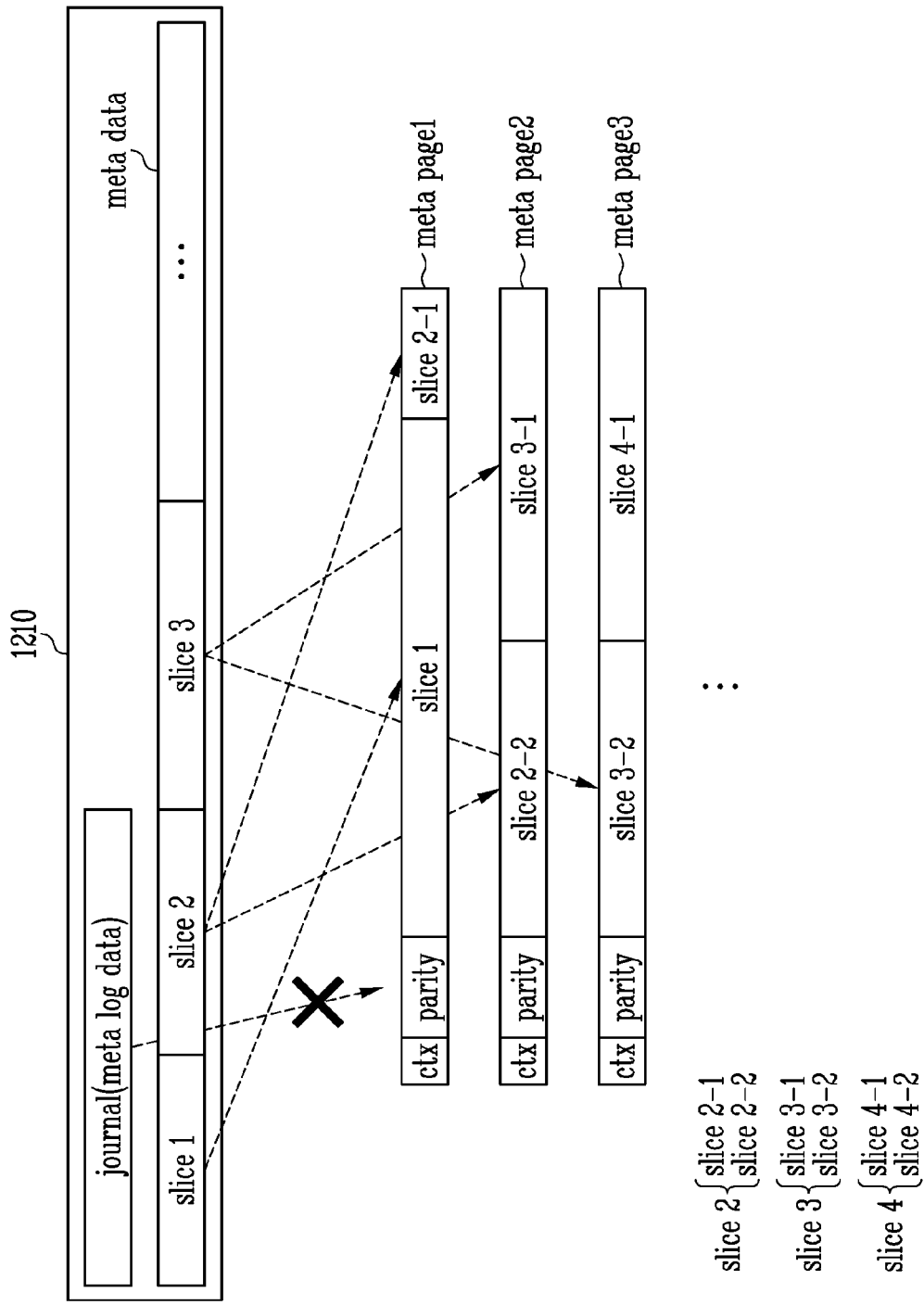
FIG. 10 is a diagram illustrating a meta page generated according to a second layout in accordance with an embodiment of the disclosed technology.

FIG. 10 is a diagram illustrating another layout of the meta page in accordance with an embodiment different from FIG. 9. The layout used to generate the meta page shown in FIG. 10 will be referred to as a second layout different from the first layout used to generate the meta page shown in FIG. 9.

Referring to FIG. 10, the memory controller 1200 may load meta data stored in the internal memory 1210 in response to a request received from the host 2000, and acquire at least one meta slice by dividing the loaded meta data. The request received from the host 2000 is a request in response to which the meta data is not changed or it is unnecessary to update journal data, and may include at least one of a shutdown request, a firmware update request, a format request, and a sanitization request. A size of one meta slice may be equal to that of a single meta slice included in a meta page according to a first layout so as to maintain compatibility with the first layout.

The memory controller 1200 may generate meta data based on the second layout different from the first layout. For example, a meta page according to the second layout may include one meta slice and at least a portion of another meta slice ("additional meta slice"). The meta page according to the second layout allows to include at least a portion of the additional meta slice having a size corresponding to that occupied by journal data in the meta page according to the first layout shown in FIG. 9.

The meta page according to the second layout may also include at least one of a parity data for recovering an error of the meta data and context data ctx. The meta page according to the second layout may have a size equal or corresponding to that of the meta page according to the first layout.

Referring to FIG. 10, a first meta page (meta page1) according to the second layout may have a form including a first meta slice (slice1) and a portion (slice2-1) of a second meta slice (slice2). As compared to the meta page as shown in FIG. 9, the portion (slice2-1) of the second meta slice (slice2) is included instead of the journal data. A portion of the meta page has a predetermined size to include the parity data and the context data ctx. The remaining portion of the meta page has a size to include the first meta slice (slice1) and the portion (slice2-1) of the second meta slice (slice2). In addition, a second meta page (meta page2) according to the second layout may include a portion (slice2-2) of the second meta slice (slice2) and a portion (slice3-1) of a third meta slice (slice3). The portion (slice3-1) of the third meta slice slice3 may have a size that corresponds to a remaining portion of the meta page except the parity data, the context data ctx, and the portion (slice2-2) of the second meta slice (slice2). In addition, a third meta page (meta (page3) according to the second layout may include a portion of (slice3-2) of the third meta slice (slice3) and a portion (slice4-1) of a fourth meta slice (slice4). The portion (slice4-1) of the fourth meta slice (slice4) may have a size that corresponds to a remaining portion of the meta page except the parity data, the context data ctx, and the portion (slice3-2) of the third meta slice (slice3).

In the implementation, the meta page according to the second layout does not include the journal data, but may include at least a portion of an additional meta slice.

When a meta page is generated according to the second layout and is sequentially stored in the memory device 1100 as shown in FIG. 10, meta data may be stored in the memory device 1100 with a smaller number of program operations, since a number of meta slices stored in one meta page is greater than that in FIG. 9.

Thus, the speed of an operation of storing meta data in response to a request from the host 2000 can be enhanced. In particular, since the size of meta data increases as the capacity of the memory device 1100 increases, the actual feeling effect according to the enhancement of a storage speed can be considerably exhibited.

Thus, two different types of meta pages can be generated and stored in the memory device 1100. For example, the meta page according to the second layout (without the journal data) is stored in the memory device 1100 in response to some requests including the shutdown request as shown in FIG. 10, and the meta page according to the first layout (with the journal data) as shown in FIG. 9 is stored in the memory device 1100 in other operations. In some implementations, the memory controller 1200 may be configured to check whether the meta page has journal data or not.

For example, in a power-on operation after shutdown, firmware update completion, format completion, or sanitization completion, the memory controller 1200 may read at least one meta page stored in the memory device 1100, extract meta slices from the read at least one meta page, rebuild the meta data by combining the extracted meta slices, and load the rebuilt meta data to the internal memory 1210. Since the meta page is generated according to one of the first layout and the second layout, the memory controller 1200 necessarily check the layout of the meta page so as to accurately extract the meta slices from the meta page. To this end, the meta page according to the first layout and/or the second layout may include a field indicating one of the first layout and the second layout. This field may be included in context data ctx allocated with a fixed size to the meta page according to the first layout and/or the second layout.

Since the memory controller 1200 can refer to the field indicating one of the first layout and the second layout in the context data ctx in the meta page, the memory controller 1200 may read meta page from the memory device 1100, and check whether a meta page has journal data by referring to a field included in a context data ctx of the meta page. When the corresponding field indicates the first layout, the memory controller 1200 may extract a single meta slice and journal data at a position specified in the meta page according to the first layout. When the corresponding field indicates the second layout, the memory controller 1200 may extract a single meta slice at a position specified in the meta page according to the second layout, and additionally extract at least a portion of at least one meta slice at a position corresponding to that of the journal data according to the first layout.

Figure 11:
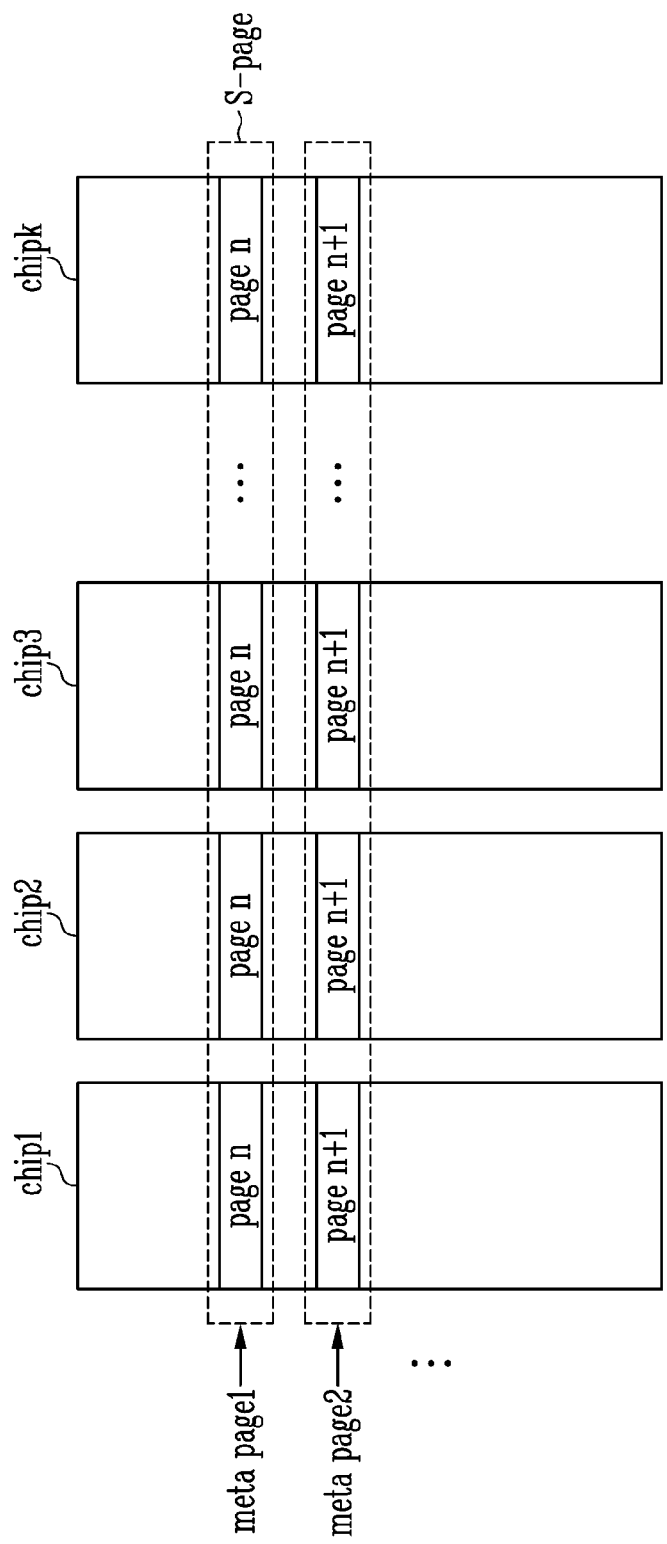
FIG. 11 is a diagram illustrating a physical area in which a meta page is stored in accordance with an embodiment of the disclosed technology.

FIG. 11 is a diagram illustrating a physical area in which a meta page is stored in accordance with an embodiment of the disclosed technology.

When a plurality of memory devices 1100 are included in the memory system 1000 as shown in FIG. 1, the memory controller 1200 may manage blocks included in each of the plurality of memory devices chip1 to chipk as one virtual super block, or manage pages included in each of the plurality of memory devices chip1 to chipk as one virtual super page S-page. The memory devices may be connected to the memory controller 1200 respectively through channels independent from each other. A super block or a super page (S-page) may be configured by using memory devices selected one by one from the respective memory device groups 1300 shown in FIG. 1.

The memory controller 1200 may store a meta page generated according to FIG. 9 or 10 in pages in a super block or in a super page (S-page) of the memory devices chip1 to chipk. For example, the memory controller 1200 may store a first meta page (meta page1) in a super page S-page configured with nth (n is a positive integer) pages in a specific block of the memory devices chip1 to chipk, and store a second meta page meta page2 in a super page S-page configured with (n+1)th pages of the memory devices chip1 to chipk. Although a case where the nth pages (or the (n+1)th pages) are configured as one super page S-page has been illustrated in FIG. 11, the disclosed technology is not necessarily limited thereto. For example, pages at different positions in blocks of the memory devices chip1 to chipk may be configured as one super page (S-page), and a meta page may be stored in the one super page (S-page).

Since the memory devices chip1 to chipk constituting the super page (S-page) are connected to the memory controller 1200 respectively through channels independent from each other, the memory controller 1200 may control the memory devices chip1 to chipk constituting the super page (S-page) to perform programming in parallel (or such that at least some of program operations performed by the memory devices overlap with each other). Thus, the memory controller 1200 may store the meta page in the super page (S-page) by using a chip-interleaving method.

The meta page may have a size corresponding to that of the super page (S-page). For example, a number of the memory devices constituting the super page (S-page) is 16, and the meta page may have a size corresponding to that of 16 physical pages. One meta slice may have the same size in the first layout and the second layout so as to maintain compatibility between the runtime operation and the shutdown operation.

Figure 12:
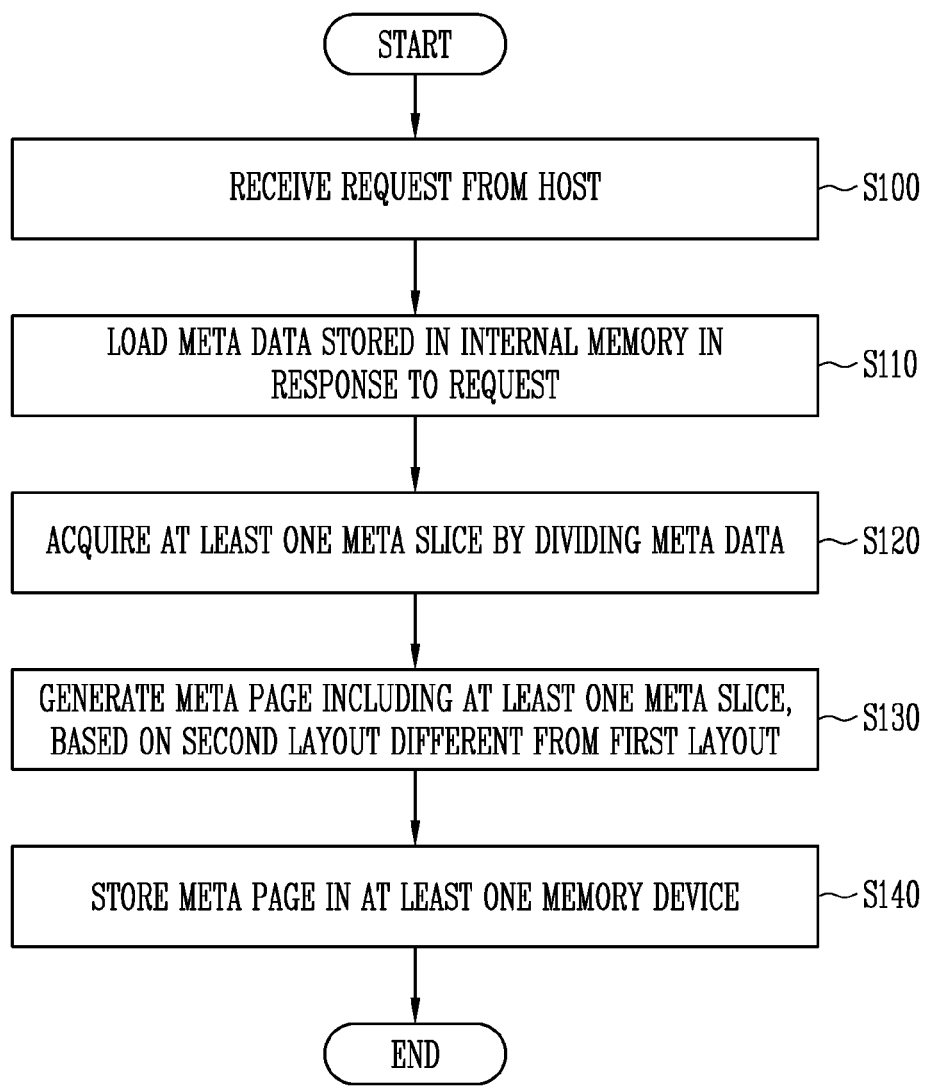
FIG. 12 is an exemplary flowchart illustrating a method for operating the memory controller shown in FIG. 1.

FIG. 12 is an exemplary flowchart illustrating a method for operating the memory controller shown in FIG. 1.

Referring to FIG. 12, the method may include receiving, at step S100, a request from the host, loading, at step S110, meta data stored in the internal memory in response to the request, acquiring, at step S120, at least one meta slice by dividing the meta data, generating, at step S130, a meta page including the at least one meta slice, based on a second layout different from a first layout, and storing, at step S140, the meta page in at least one memory device.

The memory controller may store a meta page generated based on the first layout in at least one memory device during a runtime operation.

The request may include at least one of a shutdown request, a firmware update request, a format request, and the sanitization request.

The meta data may include at least one of an addressing mapping table, a valid page table, a read count table, and an erase count table.

The meta page according to the first layout may include a single meta slice among meta slices acquired by dividing the meta data.

The meta page according to the first layout may further include journal data indicating a change in the meta data.

A meta page according to the second layout may include at least a portion of at least one meta slit among the meta slices, instead of the single meta slice and the journal data.

The at least one memory device may include a plurality of memory devices connected to the memory controller respectively through channels independent from each other.

At step S140, the meta page may be stored in a super page generated by combining pages of the respective memory devices.

The meta page may have a size corresponding to that of the super page.

The meta page may include a field indicating one of the first layout and the second layout.

The method may further include: after the storing step S140, reading the meta page stored in the at least one memory device; determining a layout of the read meta page by referring to the field included in the read meta page; and extracting the journal data from the read meta page, based on the determined layout, or extracting at least a portion of at least one meta slice among the meta slices, instead of the journal data.

The meta page according to the first layout may further include parity data having a fixed size, which is used to recover an error of the meta data.

In addition, a method for operating the memory system may include functions and operations of the memory system described with reference to FIGS. 1 to 11, and be performed by the memory controller 1200 described with reference to FIGS. 1 to 11.

Figure 13:
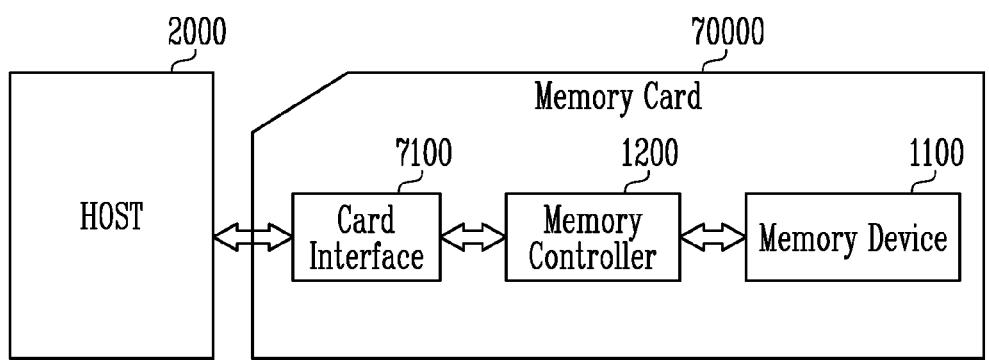
FIG. 13 is a diagram illustrating a memory card to which the memory system shown in FIG. 1 is applied.

FIG. 13 is a diagram illustrating a memory card to which the memory system shown in FIG. 1 is applied.

Referring to FIG. 13, the memory system may include a host 2000 and a memory card 70000.

The memory card 70000 may be implemented as a smart card. The memory card 70000 may include a memory device 1100, a memory controller 1200, and a card interface 7100.

The memory controller 1200 may control exchange of data between the memory device 1100 and the card interface 7100. In an embodiment, the card interface 7100 may be a secure digital (SD) interface or a multi-media card (MMC) interface, but the disclosed technology is not limited thereto.

The card interface 7100 may interface data exchange between the host 2000 and the memory controller 1200 according to a protocol of the host 2000. In some embodiments, the card interface 7100 may support a universal serial bus (USB) protocol and an inter-chip (IC)-USB protocol. The card interface 7100 may mean hardware capable of supporting a protocol used by the host 2000, software embedded in the hardware, or a signal transmission method.

Figure 14:
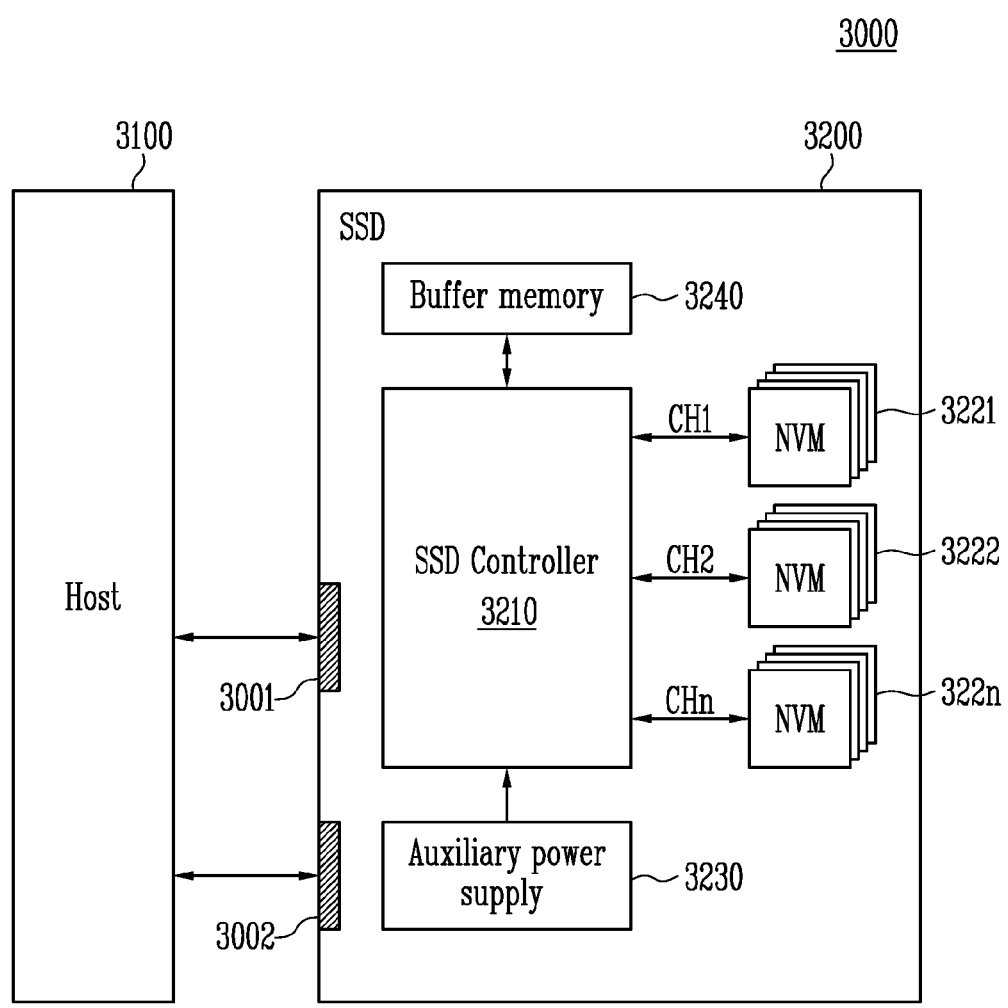
FIG. 14 is a block diagram illustrating a Solid State Drive (SSD) system to which the memory system shown in FIG. 1 is applied.

FIG. 14 is a block diagram illustrating a Solid State Drive (SDD) system to which the memory system shown in FIG. 1 is applied.

Referring to FIG. 14, the SSD system 3000 includes a host 3100 and an SSD 3200. The SSD 3200 exchanges a signal SIG with the host 3100 through a signal connector 3001, and receives power PWR through a power connector 3002. The SSD 3200 includes an SSD controller 3210, a plurality of flash memories 3221 to 322n, an auxiliary power supply 3230, and a buffer memory 3240.

In an embodiment of the disclosed technology, the SSD controller 3210 may perform a function identical or corresponding to that of the memory controller 1200 described with reference to FIGS. 1, 2, and 8. The plurality of flash memories 3221 to 322n may perform a function corresponding to that of the memory device 1100 shown in FIG. 1, and the buffer memory 3240 may perform a function corresponding to that of the internal memory 1210 shown in FIG. 8.

The SSD controller 3210 may control the plurality of flash memories 3221 to 322n in response to a signal SIG received from the host 3100. Exemplarily, the signal SIG may be a signal based on an interface between the host 3100 and the SSD 3200. For example, the signal SIG may be a signal defined by at least one of interfaces such as a Universal Serial Bus (USB), a Multi-Media Card (MMC), an embedded MMC (eMMC), a Peripheral Component Interconnection (PCI), a PCI express (PCIe), an Advanced Technology Attachment (ATA), a Serial-ATA (SATA), a Parallel-ATA (PATA), a Small Computer System Interface (SCSI), an Enhanced Small Disk Interface (ESDI), an Integrated Drive Electronics (IDE), a firewire, a Universal Flash Storage (UFS), a WI-FI, a Bluetooth, and an NVMe.

The auxiliary power supply 3230 is coupled to the host 3100 through the power connector 3002. When the supply of power from the host 3100 is not smooth, the auxiliary power supply 3230 may provide power of the SSD 3200. Exemplarily, the auxiliary power supply 3230 may be located in the SSD 3200, or be located at the outside of the SSD 3200. For example, the auxiliary power supply 3230 may be located on a main board, and provide auxiliary power to the SSD 3200.

The buffer memory 3240 operates as a buffer memory of the SSD 3200. For example, the buffer memory 3240 may temporarily store data received from the host 3100 or data received from the plurality of flash memories 3221 to 322n, or temporarily store meta data (e.g., a mapping table) of the flash memories 3221 to 322n. The buffer memory 3240 may include volatile memories such as a DRAM, an SDRAM, a DDR SDRAM, an LPDDR SDRAM, and a GRAM or nonvolatile memories such as a FRAM, a ReRAM, an STT-MRAM, and a PRAM.

In accordance with the disclosed technology, there can be provided a memory system capable of enhancing the storage speed of meta data and a method for operating a memory controller included in the memory system.

While the disclosed technology has been shown and described with reference to certain exemplary embodiments thereof, it will be understood by those skilled in the art that various changes in form and details may be made. The embodiments disclosed in this specification and drawings are only examples to facilitate an understanding of the disclosed technology, and the disclosed technology is not limited thereto. Various modifications and enhancements of the disclosed embodiments and other embodiments can be made based on what is disclosed in this patent document.

What is claimed is:

1. A memory system comprising:
one or more memory devices each including a plurality of memory cells for storing data;
a memory configured to store meta data associated with the stored data; and
a memory controller in communication with the memory and the one or more memory devices and configured to load the meta data from the memory, and generate a first meta page based on the meta data according to a first layout, and store the first meta page in the memory device,
wherein the memory controller is further configured to receive a request from a host and generate a second meta page based on a second layout different from the first layout in response to the request from the host.

2. The memory system of claim 1, wherein the request includes at least one of a shutdown request, a firmware update request, a format request, and a sanitization request.

3. The memory system of claim 1, wherein the memory controller is further configured to divide the meta data into multiple meta slices and the first meta page includes a single meta slice among the multiple meta slices.

4. The memory system of claim 3, wherein the first meta page further includes journal data indicating a change in the meta data.

5. The memory system of claim 1, wherein the memory controller is further configured to divide the meta data into multiple meta slices and the second meta page includes at least portions of two meta slices.

6. The memory system of claim 1, wherein a plurality of memory devices are connected to the memory controller respectively through channels that are independent from each other, and
wherein at least one of the first meta page and the second meta page is stored in a super page including respective pages of the plurality of memory devices.

7. The memory system of claim 6, wherein at least one of the first meta page and the second meta page has a size corresponding to that of the super page.

8. The memory system of claim 1, wherein each of the first meta page and the second meta page includes a field indicating information about which layout is used.

9. The memory system of claim 8, wherein the memory controller is further configured to read a certain meta page stored in the memory device, determine a layout of the certain meta page based on the field included in the certain meta page, and extract data from the certain meta page based on the layout determined.

10. The memory system of claim 1, wherein each of the first meta page and the second meta page further includes parity data having a fixed size and used to recover an error of the meta data.

11. A method for operating a memory controller, the method comprising:
receiving a request from a host in communication with the memory controller storing a first meta page generated during a runtime operation based on a first layout;
reading meta data stored in a memory in response to the request;
obtaining at least one meta slice by dividing the meta data;
generating a second meta page including the at least one meta slice based on a second layout different from the first layout; and
storing the second meta page in at least one memory device in communication with the memory controller.

12. The method of claim 11, wherein the request includes at least one of a shutdown request, a firmware update request, a format request, and the sanitization request.

13. The method of claim 11, wherein the first meta page includes a single meta slice.

14. The method of claim 11, wherein the first meta page includes journal data indicating a change in the meta data.

15. The method of claim 11, wherein the second meta page includes at least portions of two metal slices.

16. The method of claim 15, wherein each of the first meta page and the second meta page includes a field indicating information about which layout is used.

17. The method of claim 16, further comprising, after the storing:
reading a certain meta page stored in the at least one memory device;
determining a layout of the certain meta page based on the field included in the certain meta page; and
extracting data from the certain meta page based on the layout determined.

18. The method of claim 11, wherein a plurality of memory devices are connected to the memory controller respectively through channels that are independent from each other, and
wherein the storing includes storing the second meta page in a super page including respective pages of the plurality of memory devices.

19. The method of claim 18, wherein the second meta page has a size corresponding to that of the super page.

20. The method of claim 11, wherein each of the first meta page and the second meta page includes parity data having a fixed size and used to recover an error of the meta data.

* * * * *